US012453769B2

(12) United States Patent
Ge et al.

(10) Patent No.: US 12,453,769 B2
(45) Date of Patent: Oct. 28, 2025

(54) PHARMACEUTICAL COMPOSITION AND USE THEREOF

(71) Applicant: Grand Theravac Life Sciences (Nanjing) Co., Ltd., Nanjing (CN)

(72) Inventors: Jun Ge, Nanjing (CN); Jianqiang Li, Nanjing (CN); Jiaojiao Sun, Nanjing (CN); Sulin Ren, Nanjing (CN); Tong Zhou, Nanjing (CN); Shiwei Wang, Nanjing (CN); Xiaodong Wang, Nanjing (CN); Jingfeng Huang, Nanjing (CN); Yue Chen, Nanjing (CN)

(73) Assignee: Grand Theravac Life Sciences (Nanjing) Co., Ltd., Nanjing (CN)

( * ) Notice: Subject to any disclaimer, the term of this patent is extended or adjusted under 35 U.S.C. 154(b) by 691 days.

(21) Appl. No.: 17/784,086

(22) PCT Filed: Dec. 11, 2020

(86) PCT No.: PCT/CN2020/135571
§ 371 (c)(1),
(2) Date: Jun. 9, 2022

(87) PCT Pub. No.: WO2021/115409
PCT Pub. Date: Jun. 17, 2021

(65) Prior Publication Data
US 2023/0076371 A1 Mar. 9, 2023

(30) Foreign Application Priority Data
Dec. 13, 2019 (CN) .......................... 201911279536.0

(51) Int. Cl.
| C07K 16/28 | (2006.01) |
| A61K 31/711 | (2006.01) |
| A61K 39/12 | (2006.01) |
| A61K 39/245 | (2006.01) |
| A61K 39/29 | (2006.01) |
| A61K 39/39 | (2006.01) |
| A61P 31/04 | (2006.01) |
| A61P 31/12 | (2006.01) |
| A61P 31/22 | (2006.01) |
| A61K 39/00 | (2006.01) |

(52) U.S. Cl.
CPC ............ *A61K 39/39* (2013.01); *A61K 31/711* (2013.01); *A61K 39/245* (2013.01); *A61K 39/29* (2013.01); *A61K 39/292* (2013.01); *A61P 31/04* (2018.01); *A61P 31/12* (2018.01); *A61P 31/22* (2018.01); *C07K 16/2803* (2013.01); *A61K 2039/55561* (2013.01); *A61K 2039/55577* (2013.01)

(58) Field of Classification Search
None
See application file for complete search history.

(56) References Cited

U.S. PATENT DOCUMENTS

| 9,284,355 | B2 | 3/2016 | Friedman et al. |
| 9,878,035 | B2 * | 1/2018 | Du .................. A61P 31/20 |
| 2016/0136264 | A1 | 5/2016 | Du et al. |

FOREIGN PATENT DOCUMENTS

| BE | 1022523 | | 5/2016 |
| CN | 1372473 | A | 10/2002 |
| CN | 101189254 | | 5/2008 |
| CN | 101559225 | | 10/2009 |
| CN | 101616688 | A | 12/2009 |
| CN | 102631670 | | 8/2012 |
| CN | 103028113 | | 4/2013 |
| CN | 103827131 | | 5/2014 |
| CN | 104043120 | A | 9/2014 |
| CN | 104873969 | A | 9/2015 |
| CN | 105906721 | A | 8/2016 |
| CN | 106632694 | | 5/2017 |
| CN | 110035772 | A | 7/2019 |
| CN | 110198736 | | 9/2019 |
| CN | 112972670 | | 6/2021 |
| JP | 2002-522510 | | 7/2002 |
| JP | 2002-542203 | | 12/2002 |
| JP | 2003-527352 | | 9/2003 |
| JP | 2008-531637 | | 8/2008 |
| JP | 2016-512204 | | 4/2016 |
| KR | 10-2007-0114230 | | 11/2007 |
| KR | 10-2009-0093677 | | 9/2009 |
| WO | 0043527 | | 7/2000 |

(Continued)

OTHER PUBLICATIONS

Bacelo et al. (BioMed Research International, 2014, p. 1-10).*
Depledge et al. (Accession No. QCA43862, Aug. 2018).*
Thomsson, Elisabeth, et al., "Recombinant glycoprotein E produced in mammalian cells in large-scale as an antigen for varicella-zoster-virus serology," Journal of Virological Methods 175:53-59, Apr. 2011.
Yang, Jixing, et al., "Progress of research in chicken pox and herpes zoster virus and their vaccines," Shanghai Journal of Preventive Medicine 20(1):22-25, Dec. 2008.
Chinese Search Report dated Sep. 24, 2023, issued in corresponding Chinese Application No. 2020114564359, filed Dec. 11, 2020, 8 pages.

(Continued)

*Primary Examiner* — Agnieszka Boesen
(74) *Attorney, Agent, or Firm* — Christensen O'Connor Johnson Kindness PLLC (57) ABSTRACT

A pharmaceutical composition comprising: i) a herpes gE protein, an active fragment of the protein, a variant of the protein, or a mixture of at least two of them; ii) an immunostimulatory composition comprising a saponin and a CpG oligodeoxynucleotide, or consisting of an adjuvant comprising a saponin and a CpG oligodeoxynucleotide. Use of the pharmaceutical composition in the preparation of a medicament for preventing and/or treating a varicella-zoster virus infection and/or a varicella-zoster virus mediated disease. The pharmaceutical composition achieves an unexpected technical effect and can mediate a stronger immune response.

19 Claims, 3 Drawing Sheets
Specification includes a Sequence Listing.

(56) References Cited

FOREIGN PATENT DOCUMENTS

| WO | 2005039634 | A1 |   | 5/2005 |           |
|----|------------|----|---|--------|-----------|
| WO | 2011011495 | A1 |   | 1/2011 |           |
| WO | WO2011011495 | | * | 1/2011 | ............... C07K 1/00 |

OTHER PUBLICATIONS

Japanese Notification of Reasons for Refusal dated Sep. 26, 2024, issued in corresponding Japanese Application No. 2022-535203, filed Dec. 11, 2020, 10 pages.

Canadian Examiner's Report mailed Aug. 30, 2024, issued in corresponding Canadian Application No. 3,161,638, filed Dec. 11, 2020, 3 pages.

Written Opinion as mailed on Mar. 10, 2021, issued in corresponding International Application No. PCT/CN2020/135571 filed Dec. 11, 2020, 5 pages.

International Search Report as mailed on Mar. 10, 2021, issued in corresponding International Application No. PCT/CN2020/135571 filed Dec. 11, 2020, 6 pages.

Fan et al., "Progress in research on a novel recombinant varicella zoster virus subunit vaccine Shingrix," Chinese Journal of Biologicals, 32(7):814-818, Jul. 2019, 6 pages.

Office Action mailed Aug. 17, 2023, issued in related Canadian Patent Application No. 3,161,638 filed Jun. 13, 2022, 7 pages.

Search Report mailed May 8, 2024, issued in corresponding Application No. TW 109143765, filed Dec. 11, 2020, 3 pages.

Supplementary European Search Report mailed Aug. 2, 2024, issued in corresponding Application No. EP 20900086, filed Dec. 11, 2020, 9 pages.

Examination Report mailed Jun. 24, 2024, issued in corresponding Application No. AU 2020400234, filed Dec. 11, 2020, 3 pages.

Korean Notice of Preliminary Rejection mailed Apr. 30, 2025, issued in corresponding Korean Application No. 10-2022-7023841, filed Jul. 11, 2022, 12 pages.

\* cited by examiner

```
                    SEQUENCE LISTING

<160> NUMBER OF SEQ ID NOS: 23

<210> SEQ ID NO 1
<211> LENGTH: 518
<212> TYPE: PRT
<213> ORGANISM: Artificial Sequence
<220> FEATURE:
<223> OTHER INFORMATION: Synthetic

<400> SEQUENCE: 1

Ser Val Leu Arg Tyr Asp Asp Phe His Ile Asp Glu Asp Lys Leu Asp
1               5                   10                  15

Thr Asn Ser Val Tyr Glu Pro Tyr Tyr His Ser Asp His Ala Glu Ser
                20                  25                  30

Ser Trp Val Asn Arg Gly Glu Ser Ser Arg Lys Ala Tyr Asp His Asn
            35                  40                  45

Ser Pro Tyr Ile Trp Pro Arg Asn Asp Tyr Asp Gly Phe Leu Glu Asn
    50                  55                  60

Ala His Glu His His Gly Val Tyr Asn Gln Gly Arg Gly Ile Asp Ser
65                  70                  75                  80

Gly Glu Arg Leu Met Gln Pro Thr Gln Met Ser Ala Gln Glu Asp Leu
                85                  90                  95

Gly Asp Asp Thr Gly Ile His Val Ile Pro Thr Leu Asn Gly Asp Asp
                100                 105                 110

Arg His Lys Ile Val Asn Val Asp Gln Arg Gln Tyr Gly Asp Val Phe
            115                 120                 125

Lys Gly Asp Leu Asn Pro Lys Pro Gln Gly Gln Arg Leu Ile Glu Val
    130                 135                 140

Ser Val Glu Glu Asn His Pro Phe Thr Leu Arg Ala Pro Ile Gln Arg
145                 150                 155                 160

Ile Tyr Gly Val Arg Tyr Thr Glu Thr Trp Ser Phe Leu Pro Ser Leu
                165                 170                 175

Thr Cys Thr Gly Asp Ala Ala Pro Ala Ile Gln His Ile Cys Leu Lys
                180                 185                 190

His Thr Thr Cys Phe Gln Asp Val Val Val Asp Val Asp Cys Ala Glu
            195                 200                 205

Asn Thr Lys Glu Asp Gln Leu Ala Glu Ile Ser Tyr Arg Phe Gln Gly
    210                 215                 220
```

```
Lys Lys Glu Ala Asp Gln Pro Trp Ile Val Val Asn Thr Ser Thr Leu
225                 230                 235                 240

Phe Asp Glu Leu Glu Leu Asp Pro Pro Glu Ile Glu Pro Gly Val Leu
            245                 250                 255

Lys Val Leu Arg Thr Glu Lys Gln Tyr Leu Gly Val Tyr Ile Trp Asn
        260                 265                 270

Met Arg Gly Ser Asp Gly Thr Ser Thr Tyr Ala Thr Phe Leu Val Thr
        275                 280                 285

Trp Lys Gly Asp Glu Lys Thr Arg Asn Pro Thr Pro Ala Val Thr Pro
290                 295                 300

Gln Pro Arg Gly Ala Glu Phe His Met Trp Asn Tyr His Ser His Val
305                 310                 315                 320

Phe Ser Val Gly Asp Thr Phe Ser Leu Ala Met His Leu Gln Tyr Lys
                325                 330                 335

Ile His Glu Ala Pro Phe Asp Leu Leu Leu Glu Trp Leu Tyr Val Pro
            340                 345                 350

Ile Asp Pro Thr Cys Gln Pro Met Arg Leu Tyr Ser Thr Cys Leu Tyr
        355                 360                 365

His Pro Asn Ala Pro Gln Cys Leu Ser His Met Asn Ser Gly Cys Thr
        370                 375                 380

Phe Thr Ser Pro His Leu Ala Gln Arg Val Ala Ser Thr Val Tyr Gln
385                 390                 395                 400

Asn Cys Glu His Ala Asp Asn Tyr Thr Ala Tyr Cys Leu Gly Ile Ser
                405                 410                 415

His Met Glu Pro Ser Phe Gly Leu Ile Leu His Asp Gly Gly Thr Thr
            420                 425                 430

Leu Lys Phe Val Asp Thr Pro Glu Ser Leu Ser Gly Leu Tyr Val Phe
        435                 440                 445

Val Val Tyr Phe Asn Gly His Val Glu Ala Val Ala Tyr Thr Val Val
450                 455                 460

Ser Thr Val Asp His Phe Val Asn Ala Ile Glu Glu Arg Gly Phe Pro
465                 470                 475                 480

Pro Thr Ala Gly Gln Pro Pro Ala Thr Thr Lys Pro Lys Glu Ile Thr
                485                 490                 495

Pro Val Asn Pro Gly Thr Ser Pro Leu Leu Arg Gly Gly Gly Ser
            500                 505                 510

His His His His His His
        515

<210> SEQ ID NO 2
<211> LENGTH: 21
<212> TYPE: DNA
<213> ORGANISM: Artificial Sequence
<220> FEATURE:
<223> OTHER INFORMATION: Synthetic

<400> SEQUENCE: 2
tcgttcgttc gttcgttcgt t                                      21

<210> SEQ ID NO 3
<211> LENGTH: 25
<212> TYPE: DNA
<213> ORGANISM: Artificial Sequence
<220> FEATURE:
<223> OTHER INFORMATION: Synthetic

<400> SEQUENCE: 3
```

```
tcgttcgttc gttcgttcgt tcgtt                                              25

<210> SEQ ID NO 4
<211> LENGTH: 21
<212> TYPE: DNA
<213> ORGANISM: Artificial Sequence
<220> FEATURE:
<223> OTHER INFORMATION: Synthetic

<400> SEQUENCE: 4
tcgtcgtcgt cgtcgtcgtc g                                                  21

<210> SEQ ID NO 5
<211> LENGTH: 22
<212> TYPE: DNA
<213> ORGANISM: Artificial Sequence
<220> FEATURE:
<223> OTHER INFORMATION: Synthetic

<400> SEQUENCE: 5
tgactgtgaa cgttcgagat ga                                                 22

<210> SEQ ID NO 6
<211> LENGTH: 24
<212> TYPE: DNA
<213> ORGANISM: Artificial Sequence
<220> FEATURE:
<223> OTHER INFORMATION: Synthetic

<400> SEQUENCE: 6
tcgtcgtttt gtcgttttgt cgtt                                               24

<210> SEQ ID NO 7
<211> LENGTH: 15
<212> TYPE: PRT
<213> ORGANISM: Artificial Sequence
<220> FEATURE:
<223> OTHER INFORMATION: Synthetic

<400> SEQUENCE: 7

Ser Val Leu Arg Tyr Asp Asp Phe His Ile Asp Glu Asp Lys Leu
1               5                   10                  15

<210> SEQ ID NO 8
<211> LENGTH: 15
<212> TYPE: PRT
<213> ORGANISM: Artificial Sequence
<220> FEATURE:
<223> OTHER INFORMATION: Synthetic

<400> SEQUENCE: 8

Tyr Asp Asp Phe His Ile Asp Glu Asp Lys Leu Asp Thr Asn Ser
1               5                   10                  15

<210> SEQ ID NO 9
<211> LENGTH: 15
<212> TYPE: PRT
<213> ORGANISM: Artificial Sequence
<220> FEATURE:
<223> OTHER INFORMATION: Synthetic

<400> SEQUENCE: 9

His Ile Asp Glu Asp Lys Leu Asp Thr Asn Ser Val Tyr Glu Pro
1               5                   10                  15
```

<210> SEQ ID NO 10
<211> LENGTH: 15
<212> TYPE: PRT
<213> ORGANISM: Artificial Sequence
<220> FEATURE:
<223> OTHER INFORMATION: Synthetic

<400> SEQUENCE: 10

Asp Lys Leu Asp Thr Asn Ser Val Tyr Glu Pro Tyr Tyr His Ser
1               5                   10                  15

<210> SEQ ID NO 11
<211> LENGTH: 15
<212> TYPE: PRT
<213> ORGANISM: Artificial Sequence
<220> FEATURE:
<223> OTHER INFORMATION: Synthetic

<400> SEQUENCE: 11

Thr Asn Ser Val Tyr Glu Pro Tyr Tyr His Ser Asp His Ala Glu
1               5                   10                  15

<210> SEQ ID NO 12
<211> LENGTH: 15
<212> TYPE: PRT
<213> ORGANISM: Artificial Sequence
<220> FEATURE:
<223> OTHER INFORMATION: Synthetic

<400> SEQUENCE: 12

Tyr Glu Pro Tyr Tyr His Ser Asp His Ala Glu Ser Ser Trp Val
1               5                   10                  15

<210> SEQ ID NO 13
<211> LENGTH: 15
<212> TYPE: PRT
<213> ORGANISM: Artificial Sequence
<220> FEATURE:
<223> OTHER INFORMATION: Synthetic

<400> SEQUENCE: 13

Tyr His Ser Asp His Ala Glu Ser Ser Trp Val Asn Arg Gly Glu
1               5                   10                  15

<210> SEQ ID NO 14
<211> LENGTH: 15
<212> TYPE: PRT
<213> ORGANISM: Artificial Sequence
<220> FEATURE:
<223> OTHER INFORMATION: Synthetic

<400> SEQUENCE: 14

His Ala Glu Ser Ser Trp Val Asn Arg Gly Glu Ser Ser Arg Lys
1               5                   10                  15

<210> SEQ ID NO 15
<211> LENGTH: 15
<212> TYPE: PRT
<213> ORGANISM: Artificial Sequence
<220> FEATURE:
<223> OTHER INFORMATION: Synthetic

<400> SEQUENCE: 15

Ser Trp Val Asn Arg Gly Glu Ser Ser Arg Lys Ala Tyr Asp His
1               5                   10                  15

<210> SEQ ID NO 16

```
<211> LENGTH: 15
<212> TYPE: PRT
<213> ORGANISM: Artificial Sequence
<220> FEATURE:
<223> OTHER INFORMATION: Synthetic

<400> SEQUENCE: 16

Arg Gly Glu Ser Ser Arg Lys Ala Tyr Asp His Asn Ser Pro Tyr
1               5                   10                  15

<210> SEQ ID NO 17
<211> LENGTH: 15
<212> TYPE: PRT
<213> ORGANISM: Artificial Sequence
<220> FEATURE:
<223> OTHER INFORMATION: Synthetic

<400> SEQUENCE: 17

Ser Arg Lys Ala Tyr Asp His Asn Ser Pro Tyr Ile Trp Pro Arg
1               5                   10                  15

<210> SEQ ID NO 18
<211> LENGTH: 15
<212> TYPE: PRT
<213> ORGANISM: Artificial Sequence
<220> FEATURE:
<223> OTHER INFORMATION: Synthetic

<400> SEQUENCE: 18

Tyr Asp His Asn Ser Pro Tyr Ile Trp Pro Arg Asn Asp Tyr Asp
1               5                   10                  15

<210> SEQ ID NO 19
<211> LENGTH: 15
<212> TYPE: PRT
<213> ORGANISM: Artificial Sequence
<220> FEATURE:
<223> OTHER INFORMATION: Synthetic

<400> SEQUENCE: 19

Ser Pro Tyr Ile Trp Pro Arg Asn Asp Tyr Asp Gly Phe Leu Glu
1               5                   10                  15

<210> SEQ ID NO 20
<211> LENGTH: 15
<212> TYPE: PRT
<213> ORGANISM: Artificial Sequence
<220> FEATURE:
<223> OTHER INFORMATION: Synthetic

<400> SEQUENCE: 20

Trp Pro Arg Asn Asp Tyr Asp Gly Phe Leu Glu Asn Ala His Glu
1               5                   10                  15

<210> SEQ ID NO 21
<211> LENGTH: 15
<212> TYPE: PRT
<213> ORGANISM: Artificial Sequence
<220> FEATURE:
<223> OTHER INFORMATION: Synthetic

<400> SEQUENCE: 21

Asp Tyr Asp Gly Phe Leu Glu Asn Ala His Glu His His Gly Val
1               5                   10                  15

<210> SEQ ID NO 22
<211> LENGTH: 6
```

```
<212> TYPE: DNA
<213> ORGANISM: Artificial Sequence
<220> FEATURE:
<223> OTHER INFORMATION: Synthetic

<400> SEQUENCE: 22 ttcgtt                                                              6

<210> SEQ ID NO 23
<211> LENGTH: 9
<212> TYPE: DNA
<213> ORGANISM: Artificial Sequence
<220> FEATURE:
<223> OTHER INFORMATION: Synthetic

<400> SEQUENCE: 23 tcgtcgtcg                                                           9
```

PHARMACEUTICAL COMPOSITION AND USE THEREOF

CROSS REFERENCE TO RELATED APPLICATIONS

This application is the U.S. national phase of PCT/CN2020/135571, filed on Dec. 11, 2020, which claims priority to Chinese Application No. 201911279536.0, filed on Dec. 13, 2019, each expressly incorporated herein by reference in its entirety.

STATEMENT REGARDING SEQUENCE LISTING

The sequence listing associated with this application is provided in text format in lieu of a paper copy and is hereby incorporated by reference into the specification. The name of the text file containing the sequence listing is 3053-P31USPNP2_Seq_List_20221222_ST25_Revised.txt. The text file is 10 KB; was created on Dec. 22, 2022, contains no new matter, and is being submitted via Patent Center.

TECHNICAL FIELD

The present invention belongs to the field of biopharmaceutics. In particular, the present invention relates to a pharmaceutical composition comprising a herpes gE protein and an immunostimulatory composition, wherein the immunostimulatory composition comprises a saponin and a CpG oligodeoxynucleotide, or consists of an adjuvant comprising a saponin and a CpG 25 oligodeoxynucleotide, and the sequence of the CpG oligodeoxynucleotide has two or more copies of 5'-TTCGTT-3' (SEQ ID NO: 22) motif or 5'-TCGTCGTCG-3' (SEQ ID NO: 23) motif. The present invention also relates to use of the pharmaceutical composition for preventing herpes zoster, varicella or post-herpetic neuralgia.

BACKGROUND ART

Herpes zoster is a viral skin disease caused by varicella-zoster virus (VZV). Upon the primary infection, VZV enters the local lymph nodes to replicate through the mucosal epithelium of respiratory tract. The lymphocytes infected with the virus then enter the blood circulation via the lymphatic circulation to infect the peripheral blood mononuclear leukocytes. The virus spreads to the skin by the blood flow, and the clinical manifestation is varicella. After the varicella is cured, the virus replicates latently in the cranial ganglia and migrates along the peripheral nerves to the skin, and the clinical manifestation is herpes zoster. The most main complication of herpes zoster is post-herpetic neuralgia (PHN). About 20% of people over 50 years old will develop PHN, and with the increase of age, the likelihood of PHN occurrence is higher, and the pain persists for months or even years.

Vaccination against herpes zoster is an effective means to prevent herpes zoster and reduce complications such as PHN. Currently, the marketed herpes zoster vaccines mainly include Zostavax from Merck Sharp & Dohme Corp. and Shingrix from GlaxoSmithKline. Among them, Zostavax was marketed in 2006 as a live attenuated vaccine, and Shingrix was marketed in October, 2017 as a recombinant herpes zoster vaccine.

The present inventors have intensively studied the prior art and found that an adjuvant play an important role in the therapeutic effect of a herpes zoster vaccine. The adjuvants, oligodeoxynucleotides (CpG), are a new class of immunostimulants discovered in recent years, and their chemical nature is an oligodeoxynucleotide containing cytosine-guanine dinucleotide, which has a similar immune response to the natural pattern recognition receptors for CpG, and can bind to Toll-like receptors on cell membrane, effectively triggering a mammalian immune response through TLR9 signaling pathway. The immunoreaction elicited by CpG is mainly of Th1-type, which can induce a conversion of immune response from Th2-type to Th1-type, thus stimulating cellular immunity. By activating immunocompetent cells such as T cells, B cells, and NK cells, etc., a large number of multiple cytokines are generated, thereby enhancing the specific and non-specific immune effects of the body, which are an important link between the innate and acquired immunity.

Saponins are a class of glycosides, the aglycons of which are triterpene or spirostane compounds, and belong to plant-derived adjuvants. The common saponin adjuvants at present include QS series, which are the saponins extracted from quillaja, and among the series, the most common adjuvant is QS-21 adjuvant. However, QS-21 may induce cell hemolysis and has some systemic and local toxic/side effects. Alving et al.' study (ALVING CR, MATYAS G, BECK Z, et al. Revue Roumaine de Chimie, 2016, 61(8): 631-635.) found that ALF liposomes in combination with MPLA and QS-21 as an adjuvant against HIVgp140 protein could effectively increase the antibody titer in serum.

Immunostimulatory compositions of a saponin and a CpG oligodeoxynucleotide have been reported in the prior art (WO2001051083A3) wherein the CpG adjuvant primarily relates to CpG1826 and CpG7909. However, the effects of CpG adjuvants having different sequences differentiate greatly due to the structural diversity of CpG oligodeoxynucleotides.

Therefore, there is a current need for adjuvants and drugs with stronger immune effects.

Contents of the Invention

In view of the deficiencies in the prior art, the inventors have discovered, after extensive research, an immunostimulatory composition with a stronger immune effect, and a pharmaceutical composition comprising the immunostimulatory composition. The present invention provides a pharmaceutical composition comprising a dual adjuvant, wherein the saponin and CpG oligodeoxynucleotide show a high-efficiency synergistic effect, which can mediate a more potent immune response. The present invention further provides use of the pharmaceutical composition for preventing and/or treating varicella, herpes zoster or post-herpetic neuralgia. Compared with the prior art, the pharmaceutical composition of the present application exhibits an excellent immunoprophylactic and immunotherapeutic effect.

The objects of the present invention are achieved by the following technical solutions.

In one aspect, the present invention provides a pharmaceutical composition comprising:
i) a herpes gE protein, an active fragment of the protein, a variant of the protein, or a mixture of at least two of them,
ii) an immunostimulatory composition comprising a saponin and a CpG oligodeoxynucleotide, or consisting of an adjuvant comprising a saponin and a CpG oligodeoxynucleotide, wherein the sequence of the CpG oligodeoxynucleotide has two or more copies of 5'-TTCGTT-3' (SEQ ID NO: 22) motif or 5'-TCGTCGTCG-3' (SEQ ID NO: 23) motif.

In the pharmaceutical composition according to the present invention, the sequence of the CpG oligodeoxynucleotide is any one selected from: CpG T1: TCG TTC GTT CGT TCG TTC GTT (SEQ ID NO: 2); CpG T2: TCG TTC GTT CGT TCG TTC GTT CGT T (SEQ ID NO: 3); and CpG T3: TCG TCG TCG TCG TCG TCG TCG (SEQ ID NO: 4).

Preferably, the sequence of the CpG oligodeoxynucleotide is CpG T1: TCG TTC GTT CGT TCG TTC GTT (SEQ ID NO: 2).

In the pharmaceutical composition according to the present invention, the saponin is one or more selected from the group consisting of quillaja saponin, ginsenoside, platycodin, astragaloside, notoginsenoside, glycyrrhizin, cortex albiziae saponin, ophiopogonin, saikosaponin and *panax japonicus* saponin. Preferably, the saponin is quillaja saponin, ginsenoside, platycodin or astragalin A. More preferably, the quillaja saponin is QS-7, QS-17, QS-18 or QS-21. Further preferably, the quillaja saponin is QS-21. The ginsenoside may be ginsenoside Rg1, ginsenoside Rg3, ginsenoside Rb1 or ginsenoside Re. The platycodin may be platycodin D, platycodin D2 or a mixture thereof. The astragaloside may be a monomer such as astragalin A (astragaloside IV), astragaloside I, astragaloside II, and the like, or a mixture of two or more of these saponin monomers. The notoginsenoside may be notoginsenoside R1. The ophiopogonin may be ophiopogonin D or the like. The saikosaponin may be saikosaponin a, saikosaponin d, or a mixture thereof. The cortex albiziae saponin may be cortex albiziae total saponins or the like. The glycyrrhizin may be total glycyrrhizins. The *panax japonicus saponin* may be *panax japonicus* total saponins.

In the pharmaceutical composition according to the invention, the adjuvant comprising a saponin is an immunostimulating complex adjuvant (Iscom adjuvant).

In the pharmaceutical composition according to the present invention, the CpG oligodeoxynucleotide comprises a phosphorothioate linkage. Preferably, the CpG oligodeoxynucleotide is a thio-oligodeoxynucleotide, more preferably a perthio-oligodeoxynucleotide.

In the pharmaceutical composition according to the present invention, the weight ratio of the CpG oligodeoxynucleotide to the saponin is 1~40:0.1~2, preferably 2~40:0.1~2.

In the pharmaceutical composition according to the present invention, the weight ratio of the CpG oligodeoxynucleotide to the saponin is 2:1.

The vaccine composition according to the invention further comprises: iii) a pharmaceutically acceptable carrier.

In the pharmaceutical composition according to the present invention, the herpes gE protein comprises or consists of the amino acid sequence shown by SEQ ID NO: 1. Preferably, the active fragment of the herpes gE protein comprises or consists of consecutive amino acids from position 1 to position X of SEQ ID NO: 1, wherein X is an integer between 507 and 518.

In the pharmaceutical composition according to the invention, the weight ratio between Components i) and ii) in the vaccine composition is 1:1.1~42, preferably 1:2.1~42.

In the pharmaceutical composition according to the invention, the weight ratio between Components i) and ii) in the vaccine composition is 1:3.

In another aspect, the present invention provides a herpes zoster or varicella vaccine comprising the pharmaceutical composition.

In a further aspect, the present invention provides use of the pharmaceutical composition in the preparation of a medicament for preventing and/or treating a varicella-zoster virus infection and/or a varicella-zoster virus mediated disease. Preferably, the varicella-zoster virus infection and/or the varicella-zoster virus mediated disease is selected from the group consisting of varicella, herpes zoster, and post-herpetic neuralgia.

In a further aspect, the present invention provides use of the pharmaceutical composition in the preparation of a medicament for generating a humoral immune response and/or a cellular immune response against varicella-zoster virus in a subject. The medicament is a herpes zoster vaccine or a varicella vaccine, preferably a herpes zoster vaccine.

In a further aspect, the present invention provides a method for preventing and/or treating a varicella-zoster virus infection and/or a varicella-zoster virus-mediated disease comprising administering to a subject in need thereof a prophylactically and/or therapeutically effective amount of the pharmaceutical composition. Preferably, the varicella-zoster virus infection and/or the varicella-zoster virus mediated disease is selected from the group consisting of varicella, herpes zoster, and post-herpetic neuralgia.

In a further aspect, the present invention provides a method for generating a humoral immune response and/or a cellular immune response against varicella-zoster virus in a subject comprising administering to a subject in need thereof an effective amount of the pharmaceutical composition.

The immunostimulatory composition provided by the present invention achieves unexpected technical effects and can mediate a stronger immune response. The immunostimulatory effect of CpG T1, CpG T2 or CpG T3 alone is weaker than that of CpG 1018, CpG 7909 or CpG 1826, etc. However, when CpG T1, CpG T2 or CpG T3 is used in combination with QS21, the immunostimulatory composition exhibits an unexpected synergistic effect, and the immune effect is significantly enhanced.

After a preliminary experimental verification, use of CpG T1, CpG T2 or CpG 3 with a herpes zoster antigen results in an equivalent effect. Among them, CpG T1 and CpG T2 contain the same motif 5'-TTCGTT-3', and CpG T3 has been verified experimentally with other antigens (such as hepatitis B surface antigen, hepatitis B core antigen, etc.), its immune effect is equivalent to that of CpG T1 or CpG T2.

In comparison with the prior art, the herpes zoster vaccine containing the immunostimulator provided by the present invention has a superior immunostimulatory effect, and the cellular immunity experiments demonstrate that this vaccine can induce a stronger production level of herpes gE protein-specific IFN-γ, and is significantly superior to a single adjuvant in terms of protein immune effect. The humoral immunity experiments also demonstrate that this vaccine can generate higher level of herpes gE protein-specific IgG/IgG1/IgG2a antibody, and its effect was superior to that of a single adjuvant and significantly superior to those of the combinations of other CPG adjuvants and QS21.

BRIEF DESCRIPTION OF THE DRAWINGS

The embodiments of the present invention will be described below in detail in conjunction with the accompanying drawings, in which.

DEFINITIONS

Unless defined otherwise, all the scientific and technical terms used herein have the same meaning as understood by one of ordinary skill in the art. With regard to the definitions and terms in the art, one of skill can refer specifically to Current Protocols in Molecular Biology (Ausubel). The abbreviations for amino acid residues are standard 3-letter and/or 1-letter codes used in the art to refer to one of 20 common L-amino acids.

Although the present invention shows the numerical ranges and approximations of parameters in broad scopes, the numerical values shown in the specific examples are reported as precisely as possible. All the numerical values, however, inherently contain a certain error necessarily resulting from the standard deviations found in their respective measurements. Additionally, all the ranges disclosed herein are to be understood to encompass any and all the subranges subsumed therein. For example, a stated range of "2 to 40" should be considered to include any and all the subranges between (and inclusive of) the minimum value of 2 and the maximum value of 40, that is, all the subranges beginning with a minimum value of 2 or more, e.g. 2 to 6.1, and ending with a maximum value of 40 or less, e.g. 5.5 to 40. Further, any reference referred to as "incorporated herein" is understood to be incorporated in its entirety.

It is further noted that, as used in this specification, the singular forms include the plural forms of the referents to which they refer, unless expressly and unequivocally limited to one referent. The term "or" may be used interchangeably with the term "and/or", unless the context clearly dictates otherwise.

As used herein, the terms "pharmaceutical composition", "combination drug", and "drug combination" may be used interchangeably and refer to a combination of at least one drug, and optionally a pharmaceutically acceptable excipient or auxiliary material, which are combined together to achieve a certain particular purpose. In certain embodiments, the pharmaceutical composition comprises temporally and/or spatially separated components, so long as they are capable of cooperating to achieve the objects of the present invention. For example, the ingredients (e.g. gE protein, QS-21, and CpG oligodeoxynucleotide) contained in the pharmaceutical composition may be administered to a subject as a whole or separately. When the ingredients contained in the pharmaceutical composition are administered separately to a subject, the ingredients may be administered to the subject simultaneously or sequentially.

As used herein, the term "CpG oligodeoxynucleotide" or "CpG-ODN" refers to a short single-chain synthetic DNA molecule containing one or more "CpG" unit(s), wherein C represents cytosine, G represents guanine and p represents a phosphodiester bond. In particular, the CpG oligodeoxynucleotide is non-methylated. In some embodiments, the CpG-ODN comprises a phosphorothioate linkage or a phosphorothioate backbone. That is to say, in some embodiments, the CpG-ODN is a phosphorothioate oligodeoxynucleotide (i.e., a thio-oligodeoxynucleotide). Preferably, all the internucleotide linkages in the CpG-ODN are phosphorothioate linkages, that is, the CpG-ODN is a perthio-oligodeoxynucleotide. In other embodiments, the CpG-ODN comprises two or more copies of 5'-TTCGTT-3' (SEQ ID NO: 22) motif or 5'-TCGTCGTCG-3' (SEQ ID NO: 23) motif. In particular, the CpG-ODN has a sequence selected from: TCG TTC GTT CGT TCG TTC GTT (SEQ ID NO: 2), TCG TTC GTT CGT TCG TTC GTT CGT T (SEQ ID NO: 3), or TCG TCG TCG TCG TCG TCG TCG (SEQ ID NO: 4), preferably TCG TTC GTT CGT TCG TTC GTT (SEQ ID NO: 2).

As used herein, "ginsenoside, platycodin, astragaloside, notoginsenoside, glycyrrhizin, cortex albiziae saponin, ophiopogonin, saikosaponin or *panax japonicus* saponin" refer to an active ingredient presented in the corresponding plant. For example, ginsenoside is a kind of sterol compounds, which mainly exist in the medicinal materials of genus *Panax* and is the active ingredients in *ginseng*. In some embodiments, the ginsenoside is preferably a monomer such as ginsenoside Rg1, ginsenoside Rg3, ginsenoside Rb1, ginsenoside Re, or a mixture of two or more of these saponin monomers. The platycodin is preferably platycodin D, platycodin D2 or a mixture thereof. The astragaloside is preferably a monomer such as astragalin A (astragaloside IV), astragaloside I, astragaloside II, and the like, or a mixture of two or more of these saponin monomers. The notoginsenoside is preferably notoginsenoside R1, or the like. The ophiopogonin is preferably ophiopogonin D or the like. The saikosaponin is preferably saikosaponin a, saikosaponin d, or a mixture thereof. The cortex albiziae saponin is preferably cortex albiziae total saponins or the like. The glycyrrhizin is preferably total glycyrrhizins or the like. The *panax japonicus* saponin is preferably *panax japonicus* total saponins or the like.

As used herein, "Iscom adjuvant" is an immunostimulatory complex adjuvant, specifically ISCOM MATRIX that does not comprise an antigen, which is an adjuvant composed of a phospholipids, a saponin, and cholesterol with a cage-like structure.

As used herein, "a therapeutically and/or prophylactically effective amount" or "an effective amount" refers to a dosage sufficient to show its benefit to the subject to which it is administered. The actual amount administered, as well as the rate and time course administered, would depend on the own conditions and severity of the subject being treated. A prescription of treatment (e.g. determination of dosage, etc.) is ultimately the responsibility of, and determined by, general practitioners and other physicians, often taking into account the disease to be treated, the conditions of the individual patient, the site of delivery, the method of administration, and other factors known to physicians.

As used herein, the term "mammal" refers to a human, and may also be other animals, such as wild animals (e.g. herons, storks, cranes, etc.), domestic animals (e.g. ducks, geese, etc.) or laboratory animals (e.g. chimpanzees, monkeys, rats, mice, rabbits, guinea pigs, woodchucks, ground squirrels, etc.).

In other embodiments, the composition of the present invention may further comprise an additional additive, such as a pharmaceutically acceptable carrier or additive, particularly when presented as a pharmaceutical formulation form.

The preferred pharmaceutical carrier is especially water, buffered aqueous solutions, preferably isotonic saline solutions such as PBS (phosphate buffer), glucose, mannitol, dextrose, lactose, starch, magnesium stearate, cellulose, magnesium carbonate, 0.3% glycerol, hyaluronic acid, ethanol or polyalkylene glycols such as polypropylene glycol, triglycerides, etc. The types of the pharmaceutical carrier used depend inter alia on whether the composition according to the present invention is formulated for oral, nasal, intradermal, subcutaneous, intramuscular or intravenous administration. The composition according to the present invention may comprise a wetting agent, an emulsifying agent or buffer substance as an additive.

The pharmaceutical composition, vaccine or pharmaceutical formulation according to the present invention may be administered by any suitable route, for example, oral, nasal, intradermal, subcutaneous, intramuscular or intravenous administration.

The present invention is further illustrated by the following description of specific embodiments in conjunction with the accompanying drawings, which are not to be construed as limitation of the present invention, and various modifications or improvements can be made by those skilled in the art in light of the basic concepts of the present invention, which are all within the scope of the present invention, as long as they do not deviate from the basic concepts of the present invention.

Best Modes for Carrying Out the Invention

The present invention is illustrated below with reference to the specific examples. Those skilled in the art will appreciate that these examples are merely illustrative of the present invention and not intended to limit the scope of the present invention in any way.

The experimental methods in the following examples are conventional, unless otherwise specified. The raw materials, reagent materials and the like used in the following examples are commercially available products, unless otherwise specified.

Example 1 Preparation Method of Recombinant Herpes Zoster Vaccine Compositions 1.1 Preparation of herpes gE protein: the amino acid sequence is shown by SEQ ID NO: 1.

Reference was made to the report of a reference, Thomsson E., Persson L. et al., "Journal of Virological Methods", 2011, Vol. 175, No. 1, pp. 53-59, and the specific steps were as follows:

According to the target protein sequence, the nucleic acid sequence was optimized so that its codons accorded with a mammalian expression system, and the target gene was synthesized. The synthesized target gene was ligated with pcDNA3.1(+) plasmid by a way of enzyme digestion and ligation, and transformed into Top 10 competence. The positive monoclones were picked up and verified by sequencing. The monoclonal bacteria were amplified massively, and a large number of plasmids suitable for cell transfection were extracted using an endotoxin-free plasmid extraction kit. Suspending CHO cells were transfected with the plasmids by a way of transient transfection. When the viability CHO cells was less than 70% or the fermentation time was more than 7 days, the supernatant of fermentation broth was collected by centrifugation at 5000 rpm at 4° C. for 30 min. The fermentation broth was dialyzed into a solution containing 50 mM Tris-HCl, 500 mM NaCl and 20 mM imidazole with a dialysis ratio of 1:100 in a chromatography cabinet at 4° C., once every 4 h, for a total of 3 times. The collected samples were purified through a nickel column, and an SDS-PAGE detection was performed on the collected samples corresponding to the target protein peak. The purified solutions having a higher purity were combined and dialyzed with a solution containing 20 mM phosphate and 150 mM NaCl in a chromatography cabinet at 4° C. for 24 h with a dialysis ratio of 1:100, and the dialysis solution was changed every 8 h. The samples were filtered through a 0.22 μm sterile filter membrane and stored in a refrigerator at 4° C. for later use.

1.2 Preparation of CPG Oligodeoxynucleotide Raw Materials:

Oligodeoxynucleotides are synthetically prepared fragments of oligodeoxynucleotide sequence containing one or more CpG motifs. The CPG sequences used in this example are shown in Table 1.

TABLE 1

Specific sequences of CPG oligodeoxynucleotide

| CPG Oligodeoxy-nucleotide | Sequence |
|---|---|
| CpG T1 | TCGTTCGTTCGTTCGTTCGTT (SEQ ID NO: 2) |
| CpG T2 | TCG TTC GTT CGT TCG TTC GTT CGT T (SEQ ID NO: 3) |
| CpG T3 | TCG TCG TCG TCG TCG TCG TCG (SEQ ID NO: 4) |
| CpG 1018 | TGACTGTGAACGTTCGAGATGA (SEQ ID NO: 5) |
| CpG 7909 | TCGTCGTTTTGTCGTTTTGTCGTT (SEQ ID NO: 6) |

Specific preparation method: a conventional solid phase phosphoramidite-phosphotriester chemical synthesis method was used for the preparation, starting from the 3' end, i.e., 1) Deprotection: first removing the protecting group DMT (dimethoxytrityl) of the nucleotide connected to CpG with trichloroacetic acid to obtain free 5' hydroxyl for the next step of condensation reaction; 2) Activation: mixing a phosphoramidite-protected nucleotide monomer and a tetrazole activator into a synthesis column to form a phosphoramidite tetrazole active intermediate which undergoes a condensation reaction with a deprotected nucleotide on CpG; 3) Connection: when the phosphoramidite tetrazole reactive intermediate encounters a deprotected nucleotide on CpG, it will undergo an affinity reaction with its 5' hydroxyl, condense and remove the tetrazole, upon which the oligonucleotide chain is extended forward by one base; 4) Oxidation: during the condensation reaction, the nucleotide monomer is connected to the oligonucleotide connected to CpG via a phosphite bond, while the phosphite bond is unstable and prone to be hydrolyzed by an acid or a base, upon which the phosphoramidite is oxidized into a phosphotriester with a sulphur-phosphorus double bond using a thio-substitution reagent, thereby obtaining a stable oligonucleotide; and 5) Blocking: in order to prevent the unreacted 5' hydroxyl connected to CpG from being extended in the subsequent circular reaction after the condensation reaction, this terminal hydroxyl is often blocked by acetylation.

After the above five steps, one deoxynucleotide is connected to the nucleotide of CpG. The above deprotection, activation, connection, oxidation and blocking processes are repeated to obtain a crude DNA fragment. Finally, it is subjected to post-synthesis treatments such as cleavage, deprotection, purification and quantification, etc.

Example 2 Screening Experiment of CPG Oligodeoxynucleotides 2.1 Experimental Animals:
C57BL/6(N) mice, female, 5 weeks old, 42 mice, purchased from Shanghai SLRC Laboratory Animal Co. Ltd.

2.2 Reagents and Materials:
The herpes gE stock solution obtained from Example 1 was diluted to 50 µg/mL using a PBS solution (purchased from Hyclone), and the CpGs obtained from Example 1 were diluted to 100 µg/mL using the PBS solution.

2.3 Experimental Grouping:
See Table 2. The dosage for each injection was 100 µL/mouse, and the control group was injected with the PBS solution at 100 µL/mouse.

TABLE 2

Grouping of experimental animals and injection amounts for each group

| Group | Number (animals) | Herpes gE protein | CpG T1 | CpG T2 | CpG T3 | CpG7909 | CpG1018 |
|---|---|---|---|---|---|---|---|
| Control | 6 | | | | | | |
| Antigen | 6 | 5 | | | | | |
| T1 | 6 | 5 | 10 | | | | |
| T2 | 6 | 5 | | 10 | | | |
| T3 | 6 | 5 | | | 10 | | |
| 7909 | 6 | 5 | | | | 10 | |
| 1018 | 6 | 5 | | | | | 10 |

2.4 Animal Immunity:
All the groups were administrated by intramuscular injection once every 2 weeks and the inoculation site was at the right rear thigh. They were administered twice continuously, that is, by injection at Weeks 0 and 2 respectively. All the mice were sacrificed at Week 4.

2.5 Detection Steps:
On Day 7 after the immunization of mice, the spleen lymphocytes were prepared according to a conventional method, and the details were as follows: the spleen were taken aseptically by being cut with sterile forceps and scissors, and placed in a 70 µm cell strainer, which was placed in a plate containing 2 mL of pre-chilled 2% FBS (purchased from GIBCO)-PBS; the spleens were ground using a grinding rod, and the spleen cells entered the plate through the meshes to obtain a cell suspension, and then the suspension was filtered by a 40 µm cell strainer (purchased from BD) and put into a 50 mL sterile centrifuge tube by using a Pasteur pipet; it was centrifuged at 500×g at 4° C. for 5 min; the supernatant was discarded, and then 2 mL of 1×erythrocyte disruption agent (purchased from BD) was added to re-suspend the cells, and the resultant was allowed to stand for 5 min at 4° C. protected from light to disrupt the red blood cells; 10 mL of 2% FBS-PBS was added to terminate the erythrocyte disruption reaction; the resultant was centrifuged at 500×g at 4° C. for 5 min; the supernatant was discarded, and then 5 mL of 2% FBS-PBS was added to re-suspend the cells for later use.

The spleen cells were stimulated with the stimulator, a gE-specific peptide library. An ELISPOT kit (BD) was used to detect the secretion level of gE antigen-specific IFN-γ according to the kit instructions. The spot number measured by the ELISPOT kit was read using ImmunoSPOT Series 3 Elispot analyzer (refer to Example 7 of Chinese patent CN104043120B for the specific operation steps). The sequences of the gE-specific peptide library are shown by SEQ ID NOs: 7~21.

TABLE 3 gE-specific peptide library

| gE-specific peptide library | Sequence |
|---|---|
| SEQ ID NO: 7 | SVLRYDDFHIDEDKL |
| SEQ ID NO: 8 | YDDFHIDEDKLDTNS |
| SEQ ID NO: 9 | HIDEDKLDTNSVYEP |
| SEQ ID NO: 10 | DKLDTNSVYEPYYHS |
| SEQ ID NO: 11 | TNSVYEPYYHSDHAE |
| SEQ ID NO: 12 | YEPYYHSDHAESSWV |
| SEQ ID NO: 13 | YHSDHAESSWVNRGE |
| SEQ ID NO: 14 | HAESSWVNRGESSRK |
| SEQ ID NO: 15 | SWVNRGESSRKAYDH |
| SEQ ID NO: 16 | RGESSRKAYDHNSPY |
| SEQ ID NO: 17 | SRKAYDHNSPYIWPR |
| SEQ ID NO: 18 | YDHNSPYIWPRNDYD |
| SEQ ID NO: 19 | SPYIWPRNDYDGFLE |
| SEQ ID NO: 20 | WPRNDYDGFLENAHE |
| SEQ ID NO: 21 | DYDGFLENAHEHHGV |

2.6 Evaluation Indicators:
If the spot number of control well ≤5 SFC and the spot number of sample well ≥10 SFC, it will be determined as positive; if 5 SFC <the spot number of control well ≤10 SFC, and the spot number of sample well/the spot number of control well ≥2, it will be determined as positive; and if the spot number of control well ≥10 SFC, and the spot number of sample well/the spot number of control well ≥3, it will be determined as positive.

Figure 1:
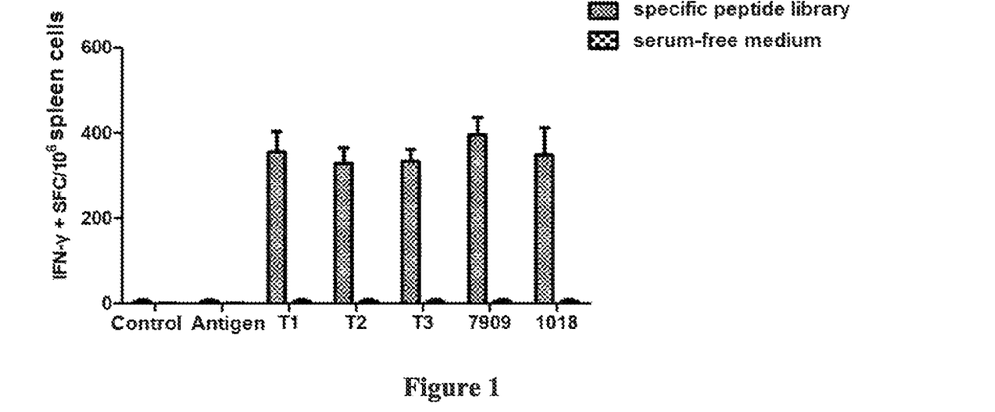
FIG. 1 shows the effects of different CPG oligodeoxynucleotides on the secretion level of herpes gE antigen-specific IFN-γ.

2.7 Experimental Results:
The results of ELISPOT spot are shown in FIG. 1. The results show that the immune effects of vaccine compositions with different CPG adjuvants were similar, wherein the effect of CpG 7909 was the best, which was slightly higher than those of CpG T1~T3; the immune effect of CpG 1018 was equivalent to those of CpG T1~T3. Among the three sequences provided by the present invention, the effect of CpG T1 was the best, which was higher than those of CpG T2 and CpG T3. Thus, the follow-up experiments will mainly focus on the comparison between CpG T1 and CpG 7909.

Example 3 Effects of Different Dosages of Immunostimulatory Composition on Efficacy of Recombinant Herpes Zoster Vaccine Composition 3.1 Experimental Animals and Model Establishment:

C57BL/6(N) mice, female, 5 weeks old, 72 mice, purchased from Shanghai SLRC Laboratory Animal Co. Ltd.

3.2 Reagents and Materials:
1) The herpes gE protein, CpG T1 and CpG 7909 were obtained from Example 1.
2) QS-21 (CAS. NO. A010-023, purchased from BRENNTAG).
3) The herpes gE stock solution was diluted to 50 µg/mL using a PBS solution (purchased from Hyclone); QS-21 was diluted to 5 µg/mL, 50 µg/mL and 100 µg/mL respectively using the PBS solution; CpG T1 was dissolved and diluted to 50 g/mL, 100 µg/mL and 2 mg/mL respectively using the PBS solution; and CPG 7909 was dissolved and diluted to 100 µg/mL using the PBS solution, for the next step.

3.3 Experimental Grouping:

See Table 4. The dosage for each injection was 100 µL/mouse, and the control group was injected with the PBS solution at 100 µL/mouse.

3.4 Experimental Steps: Following Example 2.5.

Figure 2:
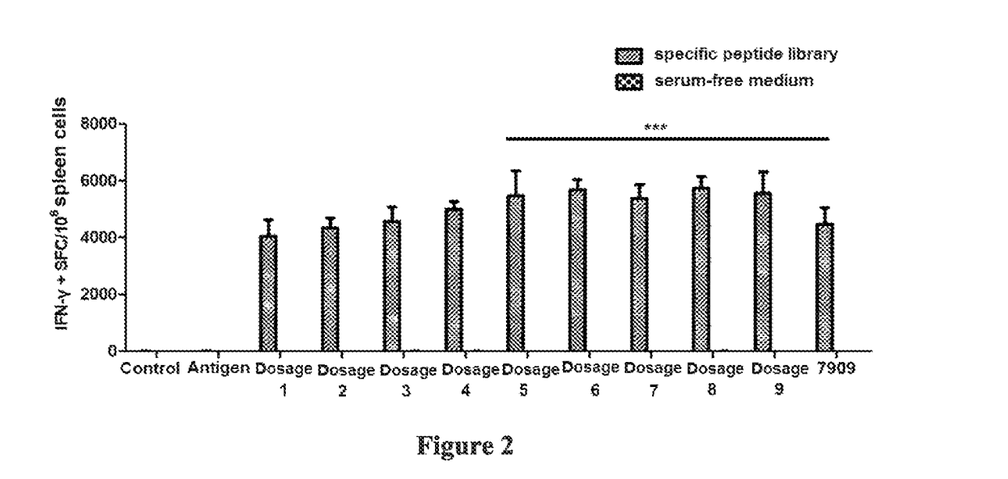
FIG. 2 shows the effects of different dosages of immunostimulatory composition on the secretion level of herpes gE antigen-specific IFN-γ.

3.5 Experimental results:

The results of ELISPOT spot are shown in FIG. 2. The results show that the dosage changes of CpG T1 and QS21 had significant effects on the therapeutic effect of the vaccine compositions, wherein the production levels of herpes gE protein-specific IFN-γ induced by the vaccine compositions of the herpes gE protein and the immunostimulatory composition (CpG T1+QS-21) with a ratio of below 1:2.1, e.g. the immunostimulatory compositions of Dosages 5-9 in Table 4 were significantly higher than that of the CPG 7909 group. However, due to the species difference, a further increase of adjuvant dosage did not induce a significant increase of the effect, presumably because mice could not accurately reflect the immune intensity of adjuvant.

Although Dosages 1, 2 and 4 in Table 4 were equivalent to the control CPG 7909 group in terms of immunostimulatory effect, but the adjuvant dosages used were lower than that of the equivalent CPG 7909 group, thus they also had an unexpected technical effect.

TABLE 4

Grouping of experimental animals

| Group | Number (animals) | Component (µg/mouse) | | | |
|---|---|---|---|---|---|
| | | Herpes gE protein | CpG T1 | QS21 | CPG7909 |
| Control | 6 | | | | |
| Antigen | 6 | 5 | | | |
| Dosage 1 | 6 | 5 | 5 | 0.5 | |
| Dosage 2 | 6 | 5 | 5 | 5 | |
| Dosage 3 | 6 | 5 | 5 | 10 | |
| Dosage 4 | 6 | 5 | 10 | 0.5 | |
| Dosage 5 | 6 | 5 | 10 | 5 | |
| Dosage 6 | 6 | 5 | 10 | 10 | |
| Dosage 7 | 6 | 5 | 200 | 0.5 | |
| Dosage 8 | 6 | 5 | 200 | 5 | |
| Dosage 9 | 6 | 5 | 200 | 10 | |
| CPG7909 | 6 | 5 | | 5 | 10 |

Example 4 Verification of Cellular Immune Efficacy of Recombinant Zoster Vaccine Compositions 4.1 Experimental Animals:

C57BL/6(N) mice, female, 5 weeks old, 48 mice, purchased from Shanghai SLRC Laboratory Animal Co. Ltd.

4.2 Reagents and Materials

The herpes gE stock solution obtained from Example 1 was diluted to 50 µg/mL and 10 µg/mL respectively, using a PBS solution (purchased from Hyclone). QS-21 (purchased from BRENNTAG, CAS. NO. A010-023) was diluted to 50 µg/mL and 10 µg/mL respectively, using the PBS solution. CpGs obtained from Example 1 were diluted to 100 µg/mL and 20 µg/mL respectively, using the PBS solution.

4.3 Experimental grouping: see Table 5. The dosage for each injection was 100 µL/mouse, and Group A as the negative control was injected with the PBS solution at 100 µL/mouse.

TABLE 5

Grouping of experimental animals and injection amounts for each group

| Group | Number (animals) | Component µg/mouse | | | |
|---|---|---|---|---|---|
| | | Herpes gE protein | CpG T1 | CpG7909 | QS-21 |
| A | 6 | | | | |
| B | 6 | 5 | | | |
| C | 6 | 5 | 10 | | |
| D | 6 | 5 | | | 5 |
| E | 6 | 5 | 10 | | 5 |
| F | 6 | 5 | | 10 | 5 |
| G | 6 | 1 | 2 | | 1 |
| H | 6 | 1 | | 2 | 1 |

4.4 Animal immunity: all the groups were administrated by intramuscular injection once every 2 weeks and the inoculation site was at the right rear thigh. They were administered twice continuously, that is, by injection at Weeks 0 and 2, respectively. All the mice were sacrificed at Week 4.

4.5 Detection steps: following Example 2.5.

4.6 Evaluation indicators: following Example 2.6.

Figure 3:
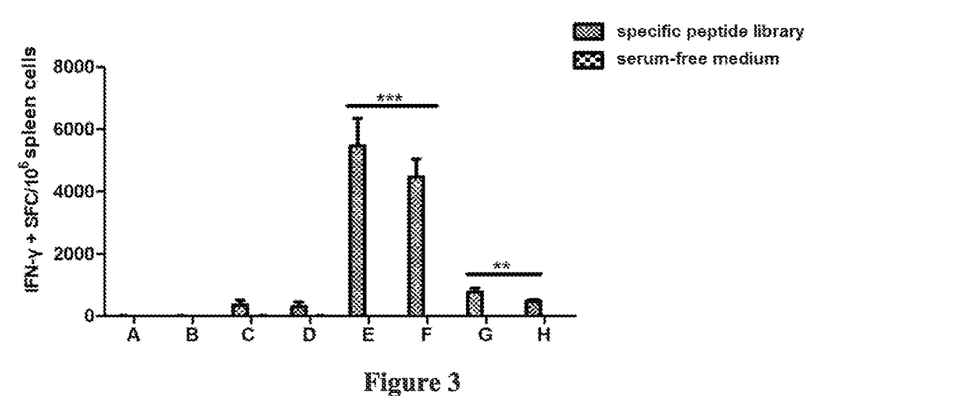
FIG. 3 shows the effects of the herpes zoster vaccines according to the present invention on the secretion level of herpes gE antigen-specific IFN-γ.

4.7 Experimental results. The levels of spot number of T-lymphocyte secreting gE-specific IFN-γ in the spleen cells of mice in each group are shown in FIG. 3, and the results of gE-specific IFN-γ positive conversion rate are shown in Table 6. The results show that the levels of spot number of T-lymphocyte secreting gE-specific IFN-γ in the spleen cells corresponding to Groups E and F with a higher immune dosage (>4000 SFC/$10^6$ spleen cells) were significantly higher than those of Groups G and H with a lower immune dosage. Among them, the levels of spot number of T-lymphocyte secreting gE-specific IFN-γ in the spleen cells corresponding to Groups E and G (CpG T1+QS-21) were higher than those of Groups F and H (CpG 7909+QS-21) with the same dosage. The IFN-γ positive conversion rates of Groups E-H were 100%.

TABLE 6

Positive conversion rates of gE-specific IFN-γ secreted by spleen cells

| | Group | | | | | | | |
|---|---|---|---|---|---|---|---|---|
| | A | B | C | D | E | F | G | H |
| Number of positive conversion/mouse | 1/6 | 0/6 | 4/6 | 5/6 | 6/6 | 6/6 | 6/6 | 6/6 |
| Positive conversion rate/% | 16.7 | 0 | 66.7 | 83.3 | 100 | 100 | 100 | 100 |

Figure 4:
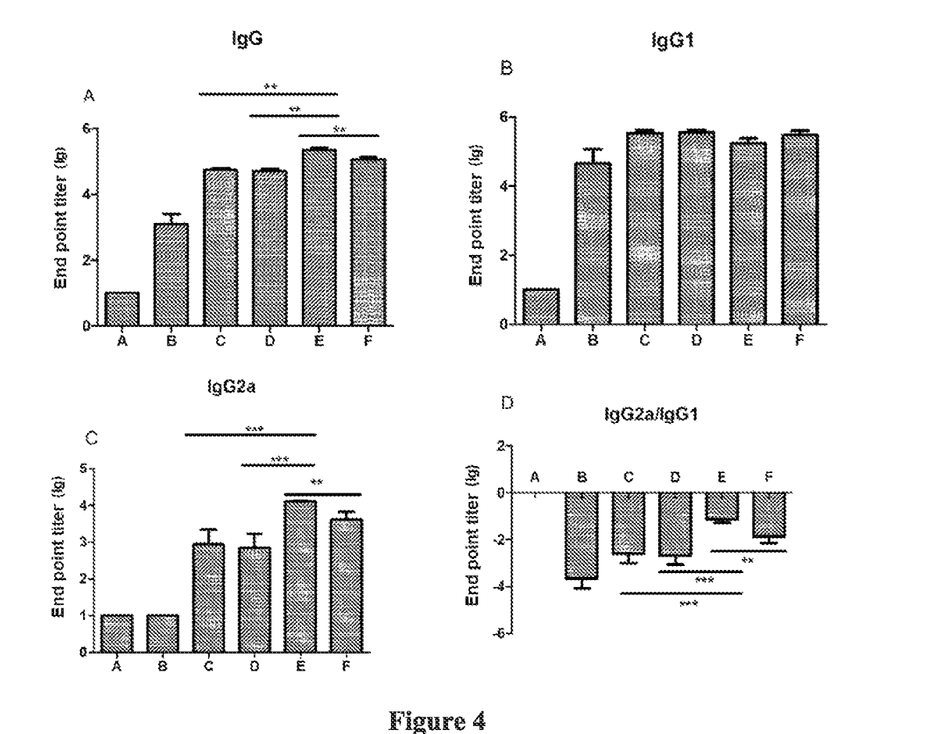
FIG. 4 shows the effects of the herpes zoster vaccines according to the present invention on the levels of antigen-specific IgG antibody and subtypes thereof in the mouse serum; wherein, Panel A: IgG levels in the mouse serum for all the groups; Panel B: IgG1 levels in the mouse serum for all the groups; Panel C: IgG2a levels in the mouse serum for all the groups; Panel D: the ratios of IgG2a to IgG1 in the mouse serum for all the groups.

Example 5 Verification of Humoral Immune Efficacy of Recombinant Herpes Zoster Vaccine Compositions 5.1 Experimental Animals:
C57BL/6(N) mice, female, 5 weeks old, 48 mice, purchased from Shanghai SLRC Laboratory Animal Co. Ltd.
5.2 Reagents and materials: following Example 3.2.
5.3 Experimental groups: following Example 3.3.
5.4 Animal immunity: all the groups were administrated by intramuscular injection once every 2 weeks and the inoculation site was at the right rear thigh. They were administered twice continuously, that is, by injection at Weeks 0 and 2, respectively.
5.5 Detection steps: on Day 28 after the immunization, the blood was collected and the serum was separated (the whole blood was placed in an incubator with a constant temperature of 37° C. for 40 min and centrifuged at 12000 rpm at 4° C. for 10 min; the supernatant was sucked and cryopreserved at −20° C. for later use). An ELISA kit (Shanghai Kehua) was used to detect the positive conversion rates of herpes gE protein-specific antibodies produced according to the kit instructions. For the detection, a blank control, a negative control and the samples to be detected were set, so that each of them had two parallel wells, wherein the negative control was negative mouse serum; except for the blank control, the negative control or the samples to be detected were added to each well followed by an enzyme conjugate. After mixing and sealing the plates, the plates were incubated at 37° C. for 30 min. Each well was washed with a washing solution and added with developer solution A and developer solution B. After mixing and sealing the plates, the plates were incubated at 37° C. for 15 min. A termination solution was added into each well and mixed evenly. The OD value of each well at a wavelength of 450 nm was read using a microplate reader.
5.6 Experimental results: the levels of antigen-specific IgG antibody and subtypes thereof in the mouse serum detected by ELISA are shown in FIG. 4, wherein Panel A: IgG levels in the mouse serum for all the groups; Panel B: IgG1 levels in the mouse serum for all the groups; Panel C: IgG2a levels in the mouse serum for all the groups; Panel D: the ratio of IgG2a to IgG1 in the mouse serum for all the groups.

The results show that the immune effect of Group E containing the immunostimulator of the present invention was significantly superior to those of the CpG group alone (Group C), the QS-21 group alone (Group D) and the dual adjuvant control (Group F). Moreover, the corresponding IgG and IgG 2a antibody levels were significantly different from those of the two groups. That is, addition of CpG to QS-21 could increase the corresponding humoral immune level.

Figure 5:
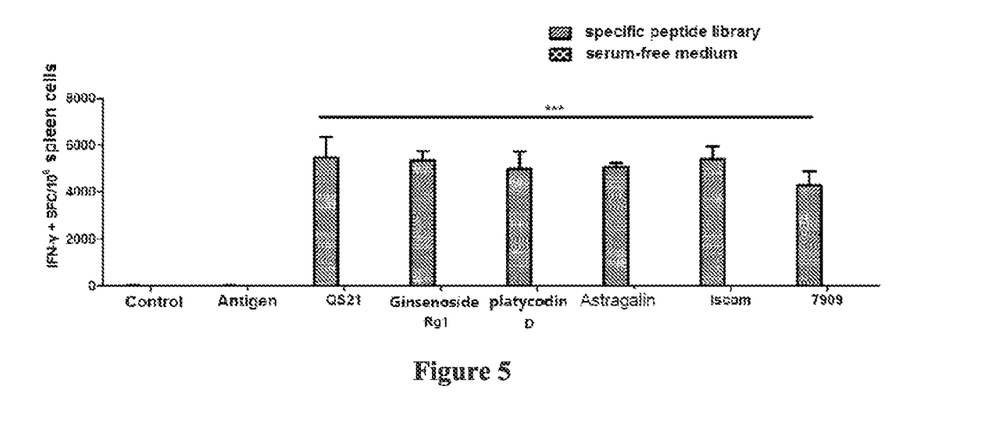
FIG. 5 shows the effects of different saponins on the secretion level of herpes gE antigen-specific IFN-γ.

Example 6 Effects of Different Saponins on Efficacy of Recombinant Herpes Zoster Vaccine Composition 6.1 Experimental Animals and Model Establishment:
C57BL/6(N) mice, female, 5 weeks old, 48 mice, purchased from Shanghai SLRC Laboratory Animal Co. Ltd.
6.2 Reagents and Materials:
 1) The Herpes gE protein, CpG T1 and CpG 7909 were obtained from Example 1.
 2) QS-21 (CAS: NO. A010-023, purchased from BRENNTAG); ginsenoside Rg1 (CAS: 22427-39-0, purchased from Nanjing Spring & Autumn Biological Engineering Co. Ltd.); astragalin A (CAS: 84687-43-4, purchased from Nanjing Spring & Autumn Biological Engineering Co. Ltd.); platycodin D (CAS: 58479-68-8, purchased from Hubei Yunmei Technology Co. Ltd.); Iscom adjuvant (purchased from Shanghai Xiyuan Biotechnology Co. Ltd.).
 3) The herpes gE stock solution was diluted to 50 μg/mL using a PBS solution (purchased from Hyclone). All the saponins were separately diluted to 50 μg/mL using the PBS solution. CpG T1 and CpG 7909 were dissolved and diluted to 100 μg/mL respectively using the PBS solution, for the next step.
6.3 Experimental Grouping:
See Table 7. The dosage for each injection was 100 t/mice, and the control group was injected with the PBS solution at 100 μL/mouse.
6.4 Experimental steps: following Example 2.5.
6.5 Experimental Results:
The results of ELISPOT spot are shown in FIG. 5. The results show that use of CpG T1 in combination with various saponins resulted in a high-efficiency synergistic effect, and the induced production levels of gE-specific IFN-γ were significantly higher than those by the combinations of other CpGs and saponins, wherein QS-21 had the best effect.

TABLE 7

Grouping of experimental animals

| | | Component (μg/mouse) | | | | | | | |
|---|---|---|---|---|---|---|---|---|---|
| Group | Number (animals) | gE | CpG T1 | QS-21 | Ginsenoside Rg1 | Platycodin D | Astragalin A | Iscom adjuvant | CpG 7909 |
| Control | 6 | | | | | | | | |
| Antigen | 6 | 5 | | | | | | | |
| QS-21 | 6 | 5 | 10 | 5 | | | | | |
| Ginsenoside Rg1 | 6 | 5 | 10 | | 5 | | | | |
| Platycodin D | 6 | 5 | 10 | | | 5 | | | |
| Astragalin A | 6 | 5 | 10 | | | | 5 | | |

TABLE 7-continued

| | | Component (μg/mouse) | | | | | | | |
|---|---|---|---|---|---|---|---|---|---|
| Group | Number (animals) | gE | CpG T1 | QS-21 | Ginsenoside Rg1 | Platycodin D | Astragalin A | Iscom adjuvant | CpG 7909 |
| Iscom adjuvant | 6 | 5 | 10 | | | | | 5 | |
| 7909 | 6 | 5 | | 5 | | | | | 10 |

In conclusion, the herpes zoster vaccine provided by the present invention has a superior immunostimulatory effect, and the cellular immunity experiments demonstrate that this vaccine can induce a stronger level of herpes gE protein-specific IFN-γ, and the protein immune effect is significantly superior to that of a single adjuvant.

Although the present invention has been described in detail above, those skilled in the art will appreciate that various modifications and variations can be made to the present invention without departing from the spirit and scope of the present invention. The right scope of the present invention is not to be limited by the foregoing detailed description, and such modifications and variations are intended to fall within the scope of the appended claims.

The invention claimed is:

1. A pharmaceutical composition comprising:
   i) a herpes gE protein, an active fragment of the protein, a variant of the protein, or a mixture of at least two of them, and
   ii) an immunostimulatory composition comprising a saponin and a CpG oligodeoxynucleotide, or consisting of an adjuvant comprising a saponin and a CpG oligodeoxynucleotide,
   wherein the sequence of the CpG oligodeoxynucleotide is selected from: CpG T1: TCG TTC GTT CGT TCG TTC GTT (SEQ ID NO: 2); CpG T2: TCG TTC GTT CGT TCG TTC GTT CGT T (SEQ ID NO: 3); and CpG T3: TCG TCG TCG TCG TCG TCG TCG (SEQ ID NO: 4).

2. The pharmaceutical composition according to claim 1, wherein the saponin is one or more selected from the group consisting of quillaja saponin, ginsenoside, platycodin, astragaloside, notoginsenoside, glycyrrhizin, cortex albiziae saponin, ophiopogonin, saikosaponin and *panax japonicus* saponin.

3. The pharmaceutical composition according to claim 2, wherein the quillaja saponin is QS-7, QS-17, QS-18 or QS-21; the ginsenoside is ginsenoside Rg1, ginsenoside Rg3, ginsenoside Rb1 or ginsenoside Re; the platycodin is platycodin D, platycodin D2 or a mixture thereof; the astragaloside is astragalin A, astragaloside I, astragaloside II, or a mixture of two or more of these saponin monomers; the notoginseng saponin is notoginsenoside R1; the ophiopogonin is ophiopogonin D; the saikosaponin is saikosaponin a, saikosaponin d or a mixture thereof; the cortex albiziae saponin is cortex albiziae total saponins; the glycyrrhizin is total glycyrrhizins; and the *panax japonicus* saponin is *panax japonicus* total saponins.

4. The pharmaceutical composition according to claim 1, wherein the adjuvant comprising a saponin is Iscom adjuvant.

5. The pharmaceutical composition according to claim 1, wherein the CpG oligodeoxynucleotide comprises a phosphorothioate linkage.

6. The pharmaceutical composition according to claim 1, wherein the CpG oligodeoxynucleotide is a thio-oligodeoxynucleotide.

7. The pharmaceutical composition according to claim 1, wherein the CpG oligodeoxynucleotide is a perthio-oligodeoxynucleotide.

8. The pharmaceutical composition according to claim 1, wherein the weight ratio of the CpG oligodeoxynucleotide to the saponin is 1~40:0.1~2.

9. The pharmaceutical composition according to claim 1, wherein the weight ratio of the CpG oligodeoxynucleotide to the saponin is 2:1.

10. The pharmaceutical composition according to claim 1, wherein the pharmaceutical composition further comprises:
    iii) a pharmaceutically acceptable carrier.

11. The pharmaceutical composition according to claim 1, wherein the herpes gE protein comprises or consists of the amino acid sequence shown by SEQ ID NO: 1.

12. The pharmaceutical composition according to claim 1, wherein the active fragment of the herpes gE protein comprises or consists of consecutive amino acids from position 1 to position X of SEQ ID NO: 1, wherein X is an integer between 507 and 518.

13. The pharmaceutical composition according to claim 1, wherein the weight ratio between Components i) and ii) is 1:1.1~42.

14. The pharmaceutical composition according to claim 1, wherein the weight ratio between Components i) and ii) is 1:3.

15. A herpes zoster or varicella vaccine comprising the pharmaceutical composition of claim 1.

16. A method for preventing and/or treating a varicella-zoster virus infection and/or a varicella-zoster virus mediated disease comprising administering to a subject in need thereof an effective amount of the pharmaceutical composition according to claim 1.

17. The method according to claim 16, wherein the varicella-zoster virus infection and/or the varicella-zoster virus mediated disease is selected from the group consisting of varicella, herpes zoster, and postherpetic neuralgia.

18. A method for generating a humoral immune response and/or a cellular immune response against varicella-zoster virus in a subject comprising administering to a subject in need thereof an effective amount of the pharmaceutical composition according to claim 1.

19. The pharmaceutical composition according to claim 1, wherein the weight ratio between Components i) and ii) is 1:2.1~42.

* * * * *